US 12,064,893 B2

(12) United States Patent
Osterhouse (10) Patent No.: US 12,064,893 B2
(45) Date of Patent: Aug. 20, 2024

(54) HIGH-PRESSURE SEAL FOR A LIQUID JET CUTTING SYSTEM

(71) Applicant: Hypertherm, Inc., Hanover, NH (US)

(72) Inventor: David Osterhouse, New Brighton, MN (US)

(73) Assignee: Hypertherm, Inc., Hanover, NH (US)

( * ) Notice: Subject to any disclaimer, the term of this patent is extended or adjusted under 35 U.S.C. 154(b) by 310 days.

(21) Appl. No.: 17/210,068

(22) Filed: Mar. 23, 2021

(65) Prior Publication Data

US 2021/0299903 A1  Sep. 30, 2021

Related U.S. Application Data

(60) Provisional application No. 62/994,156, filed on Mar. 24, 2020.

(51) Int. Cl.
*B26F 3/00* (2006.01)
*B05B 1/10* (2006.01)
*B05B 9/04* (2006.01)

(52) U.S. Cl.
CPC ............... *B26F 3/004* (2013.01); *B05B 1/10* (2013.01); *B05B 9/0403* (2013.01)

(58) Field of Classification Search
CPC ... F16J 15/56; F16J 15/28; F16J 15/32; B26F 3/004; F04B 53/143; F04B 53/164; F04B 1/0448
See application file for complete search history.

(56) References Cited

U.S. PATENT DOCUMENTS

| 433,022 A | 7/1890 | Noyes |
| 609,752 A * | 8/1898 | Angell .................... F16J 15/28 |
| | | 277/548 |

(Continued)

FOREIGN PATENT DOCUMENTS

| CN | 101811287 A | 8/2010 |
| CN | 201650635 U | 11/2010 |

(Continued)

OTHER PUBLICATIONS

European Patent Office International Search Authority, International Search Report and Written Opinion mailed Jun. 25, 2021 for PCT/US2021/023720 filed Mar. 23, 2021, Applicant: Hypertherm, Inc., 17 pages.

(Continued)

*Primary Examiner* — Jennifer S Matthews
(74) *Attorney, Agent, or Firm* — Perkins Coie LLP (57) ABSTRACT

A seal assembly can include an annular seal having a first end portion and a second end portion. The second end portion can include a first annular face, a first tapered portion, and a radially-inner surface configured to seal an outer surface of a plunger. The seal assembly can include a backup ring having a first end portion having with a second annular face and a second tapered portion, and a second end portion. The seal assembly can include an annular hoop ring positioned between the annular seal and the annular backup ring, the annular hoop ring having a first tapered surface configured to engage the annular seal, and a second tapered surface configured to engage the annular backup ring. An angle between the second tapered surface and the longitudinal axis of the annular hoop ring can be between 50 degrees and 80 degrees.

16 Claims, 4 Drawing Sheets

(56) References Cited

U.S. PATENT DOCUMENTS

| | | | |
|---|---|---|---|
| 612,493 A * | 10/1898 | Harbinger | F16J 15/28 277/548 |
| 711,086 A * | 10/1902 | Vivian | F16J 15/28 277/533 |
| 773,665 A | 11/1904 | Murray | |
| 1,066,711 A * | 7/1913 | Cook | F16J 15/28 277/543 |
| 1,081,071 A | 12/1913 | Westland | |
| 1,144,556 A | 6/1915 | Lowe | |
| 1,544,519 A | 6/1925 | McKinley et al. | |
| 1,554,406 A | 9/1925 | Coberly | |
| 1,684,431 A | 9/1928 | Behee, Jr. | |
| 1,847,147 A | 4/1930 | Thomas, Jr. | |
| 1,937,408 A | 11/1933 | Johnson | |
| 2,007,180 A | 7/1935 | Doran et al. | |
| 2,009,932 A | 7/1935 | Klotzman | |
| 2,220,002 A | 10/1940 | Rollman et al. | |
| 2,308,347 A | 1/1943 | Asselin | |
| 2,340,975 A | 2/1944 | Morgan | |
| 2,343,890 A | 3/1944 | Dewald | |
| 2,359,352 A | 10/1944 | Bucknam et al. | |
| 2,376,287 A | 5/1945 | Sorrentino | |
| 2,403,751 A | 7/1946 | Palmer | |
| 2,456,041 A | 12/1948 | Barker | |
| 2,463,552 A | 3/1949 | Newhall | |
| 2,528,280 A | 10/1950 | Lyon | |
| 2,544,414 A | 3/1951 | Bridgman et al. | |
| 2,550,435 A | 4/1951 | Willke | |
| 2,558,035 A | 6/1951 | Bridgman | |
| 2,570,698 A | 10/1951 | Manseau | |
| 2,715,958 A | 8/1955 | Lindstrom et al. | |
| 2,728,373 A | 12/1955 | Zimpel | |
| 2,788,994 A | 4/1957 | Van De Wateren | |
| 2,819,835 A | 1/1958 | Newhall | |
| 2,822,789 A | 2/1958 | Philips et al. | |
| 2,929,120 A | 3/1960 | Brandt et al. | |
| 2,951,369 A | 9/1960 | Newhall | |
| 2,952,071 A | 9/1960 | Burt | |
| 2,985,050 A | 5/1961 | Schwacha | |
| 2,999,552 A | 9/1961 | Fox | |
| 3,068,017 A * | 12/1962 | Prosser | F16J 15/20 277/530 |
| 3,081,990 A | 3/1963 | Bromley | |
| 3,086,749 A | 4/1963 | Frye | |
| 3,088,854 A | 5/1963 | Spies, Jr. | |
| 3,095,900 A | 7/1963 | Newhall | |
| 3,106,169 A | 10/1963 | Prosser et al. | |
| 3,114,326 A | 12/1963 | Yaindl | |
| 3,137,978 A | 6/1964 | Incantalupo | |
| 3,148,528 A | 9/1964 | Reynolds | |
| 3,174,364 A | 3/1965 | Sims | |
| 3,232,638 A | 2/1966 | Bernard | |
| 3,267,718 A | 8/1966 | Grube | |
| 3,270,464 A | 9/1966 | Bowling, Jr. et al. | |
| 3,296,855 A | 1/1967 | Newhall | |
| 3,303,859 A | 2/1967 | Ackermann et al. | |
| 3,323,809 A | 6/1967 | Brookfield | |
| 3,343,794 A | 9/1967 | Voitsekhovsky | |
| 3,373,695 A | 3/1968 | Yohpe | |
| 3,382,565 A | 5/1968 | Binkley | |
| 3,424,357 A | 1/1969 | Curtze et al. | |
| 3,427,988 A | 2/1969 | Redman et al. | |
| 3,449,742 A | 6/1969 | Stapleton | |
| 3,452,412 A | 7/1969 | Allman, Jr. et al. | |
| 3,454,288 A | 7/1969 | Mancusi | |
| 3,455,566 A * | 7/1969 | Hull | F16J 15/32 277/587 |
| 3,507,740 A | 4/1970 | Gaspari | |
| 3,517,701 A | 6/1970 | Smith | |
| 3,521,853 A | 7/1970 | Gillis, Jr. et al. | |
| 3,530,273 A | 9/1970 | Bollinger et al. | |
| 3,543,444 A | 12/1970 | Mehta | |
| 3,564,971 A | 2/1971 | Wagner et al. | |
| 3,574,917 A | 4/1971 | Miyazaki | |
| 3,593,459 A | 7/1971 | Kulischenko | |
| 3,614,265 A | 10/1971 | Ohrberg | |
| 3,668,498 A | 6/1972 | Austin, Jr. | |
| 3,668,916 A | 6/1972 | Ledebur | |
| 3,702,624 A | 11/1972 | Fries | |
| 3,705,693 A | 12/1972 | Franz | |
| 3,708,936 A | 1/1973 | Rogers | |
| 3,711,633 A | 1/1973 | Ghirardi et al. | |
| 3,718,017 A | 2/1973 | Blackburn | |
| 3,746,256 A | 7/1973 | Hall et al. | |
| 3,746,483 A | 7/1973 | Hindel et al. | |
| 3,750,961 A | 8/1973 | Franz | |
| 3,756,106 A | 9/1973 | Chadwick et al. | |
| 3,765,661 A | 10/1973 | Omura | |
| 3,769,753 A | 11/1973 | Fleischer | |
| 3,785,707 A | 1/1974 | Mitsuoka | |
| 3,789,741 A | 2/1974 | Hallberg | |
| 3,834,082 A | 9/1974 | Grudzinski | |
| 3,834,912 A | 9/1974 | Grudzinski | |
| 3,851,899 A | 12/1974 | Franz | |
| 3,870,941 A | 3/1975 | Ikenga et al. | |
| 3,907,307 A * | 9/1975 | Maurer | F16J 15/166 277/513 |
| 3,915,291 A | 10/1975 | Vogts | |
| 3,918,331 A | 11/1975 | Svanstrom | |
| 3,932,961 A | 1/1976 | Pagella et al. | |
| 4,006,890 A | 2/1976 | Vainer et al. | |
| 3,997,111 A | 12/1976 | Thomas et al. | |
| 3,999,384 A | 12/1976 | Mohaupt | |
| 4,009,860 A | 3/1977 | Lingnau | |
| 4,026,322 A | 5/1977 | Thomas | |
| 4,029,440 A | 6/1977 | Olsen | |
| 4,031,369 A | 6/1977 | Heaman et al. | |
| 4,042,178 A | 8/1977 | Veltrup et al. | |
| 4,048,841 A | 9/1977 | Kent | |
| 4,048,918 A | 9/1977 | Peck | |
| 4,050,001 A | 9/1977 | Kishi et al. | |
| 4,050,862 A | 9/1977 | Buse | |
| 4,065,953 A | 1/1978 | Frentzen et al. | |
| 4,066,944 A | 1/1978 | Leenhouts | |
| 4,075,789 A | 2/1978 | Dremann | |
| 4,078,727 A | 3/1978 | Lingnau | |
| 4,081,200 A | 3/1978 | Cheung | |
| 4,081,892 A | 4/1978 | Mercer | |
| 4,084,083 A | 4/1978 | McNally et al. | |
| 4,089,199 A | 5/1978 | Siemonsen | |
| 4,090,382 A | 5/1978 | Schott | |
| 4,102,611 A | 7/1978 | Broker | |
| 4,125,969 A | 11/1978 | Easton | |
| 4,134,430 A | 1/1979 | Mukasa et al. | |
| 4,146,355 A | 3/1979 | Broker et al. | |
| 4,162,763 A | 7/1979 | Higgins | |
| 4,164,183 A | 8/1979 | Peck | |
| 4,173,435 A | 11/1979 | Hammelmann | |
| 4,184,817 A | 1/1980 | Pareja | |
| 4,186,584 A | 2/1980 | Schott | |
| 4,192,343 A | 3/1980 | Grahac | |
| 4,195,669 A | 4/1980 | Ives et al. | |
| 4,195,970 A | 4/1980 | Zalis | |
| 4,203,022 A | 5/1980 | Couch, Jr. et al. | |
| 4,205,828 A | 6/1980 | Hooper et al. | |
| 4,214,192 A | 7/1980 | Bromer et al. | |
| 4,216,415 A | 8/1980 | Shimonou et al. | |
| 4,216,906 A | 8/1980 | Olsen et al. | |
| 4,216,911 A | 8/1980 | Huperz et al. | |
| 4,237,913 A | 12/1980 | Maasberg | |
| 4,246,838 A | 1/1981 | Pulver et al. | |
| 4,253,610 A | 3/1981 | Larkin | |
| 4,256,139 A | 3/1981 | Huperz et al. | |
| 4,261,769 A | 4/1981 | Usui | |
| 4,262,757 A | 4/1981 | Johnson, Jr. et al. | |
| 4,270,379 A | 6/1981 | Van Gompel | |
| 4,272,017 A | 6/1981 | Franz | |
| 4,272,108 A | 6/1981 | Maasberg | |
| 4,277,229 A | 7/1981 | Pacht | |
| 4,282,763 A | 8/1981 | Griebeler | |
| 4,306,627 A | 12/1981 | Cheung et al. | |
| 4,306,728 A | 12/1981 | Huperz et al. | |
| 4,313,570 A | 2/1982 | Olsen | |

(56) References Cited

U.S. PATENT DOCUMENTS

| | | |
|---|---|---|
| 4,326,937 A | 4/1982 | Neumeier et al. |
| 4,339,897 A | 7/1982 | Thompson et al. |
| 4,361,748 A | 11/1982 | Couch, Jr. |
| 4,371,001 A | 2/1983 | Olsen |
| 4,392,534 A | 7/1983 | Miida |
| 4,392,784 A | 7/1983 | Hanafi |
| 4,401,345 A | 8/1983 | Archibald |
| 4,404,507 A | 9/1983 | Dean et al. |
| 4,412,792 A | 11/1983 | LaBorde et al. |
| 4,415,867 A | 11/1983 | Rubin |
| 4,428,275 A | 1/1984 | Huperz et al. |
| 4,435,902 A | 3/1984 | Mercer et al. |
| 4,437,525 A | 3/1984 | O'Hanlon et al. |
| 4,447,178 A | 5/1984 | Esser |
| 4,456,132 A | 6/1984 | LaValle et al. |
| 4,456,440 A | 6/1984 | Korner |
| 4,456,863 A | 6/1984 | Matusek |
| 4,470,607 A * | 9/1984 | Schier ............... F16J 15/48 277/530 |
| 4,477,237 A | 10/1984 | Grable |
| 4,478,368 A | 10/1984 | Yie |
| 4,494,415 A | 1/1985 | Elliston |
| 4,495,845 A | 1/1985 | Sherby |
| 4,524,544 A | 6/1985 | Habib |
| 4,527,957 A | 7/1985 | Dettinger et al. |
| 4,534,427 A | 8/1985 | Wang et al. |
| 4,536,135 A | 8/1985 | Olsen et al. |
| 4,540,056 A | 9/1985 | O'Hanlon |
| 4,540,320 A | 9/1985 | Arnold |
| 4,545,157 A | 10/1985 | Saurwein |
| 4,555,758 A | 11/1985 | Inaba et al. |
| 4,555,872 A | 12/1985 | Yie |
| 4,556,371 A | 12/1985 | Post |
| 4,557,245 A | 12/1985 | Bieri |
| 4,564,995 A | 1/1986 | Kase |
| 4,566,370 A | 1/1986 | Hanafi |
| 4,573,886 A | 3/1986 | Maasberg et al. |
| 4,574,825 A | 3/1986 | Haug |
| 4,578,748 A | 3/1986 | Abe et al. |
| 4,594,924 A | 6/1986 | Windisch |
| 4,598,380 A | 7/1986 | Holmes et al. |
| 4,600,985 A | 7/1986 | Nozawa et al. |
| 4,606,150 A | 8/1986 | Grimm |
| 4,614,128 A | 9/1986 | Fickler |
| 4,616,983 A | 10/1986 | Hanafi |
| 4,626,756 A | 12/1986 | Inaba et al. |
| 4,634,353 A | 1/1987 | Huperz |
| H206 H | 2/1987 | Newhall et al. |
| 4,644,460 A | 2/1987 | Kishi et al. |
| 4,648,215 A | 3/1987 | Hashish et al. |
| 4,651,601 A | 3/1987 | Sasaki |
| 4,660,773 A | 4/1987 | O'Hanlon |
| 4,665,944 A | 5/1987 | Wallace et al. |
| 4,666,083 A | 5/1987 | Yie |
| 4,669,760 A | 6/1987 | Hashish et al. |
| 4,669,783 A | 6/1987 | Kolle |
| 4,674,239 A | 6/1987 | Jodoin |
| 4,687,426 A | 8/1987 | Yoshimura |
| 4,697,769 A | 10/1987 | Blackwelder et al. |
| 4,715,538 A | 12/1987 | Lingnau |
| 4,728,872 A | 3/1988 | Kishi et al. |
| 4,729,720 A | 3/1988 | Fujita |
| 4,738,174 A | 4/1988 | Bloomquist |
| 4,741,680 A | 5/1988 | Broker et al. |
| 4,762,051 A | 8/1988 | Besic et al. |
| 4,768,702 A | 9/1988 | Takahashi et al. |
| 4,776,769 A | 10/1988 | Hilaris |
| 4,780,064 A | 10/1988 | Olsen |
| 4,785,027 A | 11/1988 | Brasington et al. |
| 4,790,732 A | 12/1988 | Yamatani |
| 4,798,094 A | 1/1989 | Newhall et al. |
| 4,802,312 A | 2/1989 | Glaeser et al. |
| 4,815,241 A | 3/1989 | Woodson |
| 4,816,284 A | 3/1989 | Magee |
| 4,817,342 A | 4/1989 | Martin et al. |
| 4,817,874 A | 4/1989 | Jarzebowicz |
| 4,818,194 A | 4/1989 | Saurwein |
| 4,821,467 A | 4/1989 | Woodson et al. |
| 4,822,218 A | 4/1989 | Satoh |
| 4,823,550 A | 4/1989 | Decker |
| 4,852,800 A | 8/1989 | Murdock |
| 4,878,320 A | 11/1989 | Woodson |
| 4,878,815 A | 11/1989 | Stachowiak |
| 4,893,753 A | 1/1990 | Munoz et al. |
| 4,903,388 A | 2/1990 | Skonvall |
| 4,907,371 A | 3/1990 | Shoda et al. |
| 4,920,495 A | 4/1990 | Pilkington |
| 4,926,667 A | 5/1990 | Markiewicz et al. |
| 4,934,111 A | 6/1990 | Hashish et al. |
| 4,951,429 A | 8/1990 | Hashish et al. |
| 4,955,164 A | 9/1990 | Hashish |
| 4,960,039 A | 10/1990 | Robertson |
| 4,973,026 A | 11/1990 | Saurwein |
| 4,987,668 A | 1/1991 | Roesch |
| 5,018,670 A | 5/1991 | Chalmers |
| 5,037,276 A | 8/1991 | Tremoulet |
| 5,037,277 A | 8/1991 | Tan |
| 5,040,396 A | 8/1991 | Mikhail et al. |
| 5,040,405 A | 8/1991 | Honma et al. |
| 5,051,555 A | 9/1991 | Porterfield et al. |
| 5,052,089 A | 10/1991 | Gadaud et al. |
| 5,084,791 A | 1/1992 | Thanos et al. |
| 5,098,229 A | 3/1992 | Meier et al. |
| 5,099,677 A | 3/1992 | Tokura |
| 5,102,312 A | 4/1992 | Harvey |
| 5,107,630 A | 4/1992 | Lodewijk |
| 5,117,872 A | 6/1992 | Yie |
| 5,154,643 A | 10/1992 | Catania et al. |
| 5,160,802 A | 11/1992 | Moscrip |
| 5,120,084 A | 12/1992 | Hashimoto |
| 5,172,939 A | 12/1992 | Hashimoto |
| 5,176,018 A | 1/1993 | Thompson |
| 5,186,157 A | 2/1993 | Bieri |
| 5,186,393 A | 2/1993 | Yie |
| 5,199,642 A | 4/1993 | Rankin |
| 5,201,150 A | 4/1993 | Kuboyama et al. |
| 5,209,406 A | 5/1993 | Johnson |
| 5,214,972 A | 6/1993 | Larson et al. |
| 5,226,799 A | 7/1993 | Raghavan et al. |
| 5,236,459 A | 8/1993 | Koch et al. |
| 5,239,788 A | 8/1993 | Woodson |
| 5,249,161 A | 9/1993 | Jones et al. |
| 5,253,808 A | 10/1993 | Pacht |
| 5,255,853 A | 10/1993 | Munoz |
| 5,286,006 A | 2/1994 | Ogura |
| 5,297,777 A | 3/1994 | Yie |
| 5,317,873 A | 6/1994 | Okuda et al. |
| 5,320,289 A | 6/1994 | Hashish et al. |
| 5,330,167 A | 7/1994 | Plumb |
| 5,335,459 A | 8/1994 | Dale |
| 5,337,561 A | 8/1994 | Raghavan et al. |
| 5,351,714 A | 10/1994 | Barnowski |
| 5,352,254 A | 10/1994 | Celikkaya |
| 5,372,540 A | 12/1994 | Burch et al. |
| 5,380,159 A | 1/1995 | Olsen et al. |
| 5,407,379 A | 4/1995 | Shank et al. |
| 5,411,380 A | 5/1995 | Bristol et al. |
| 5,413,270 A | 5/1995 | Lechervy et al. |
| 5,441,441 A | 8/1995 | Cook et al. |
| 5,468,066 A | 11/1995 | Hammonds |
| 5,469,768 A | 11/1995 | Schumacher |
| 5,472,367 A | 12/1995 | Slocum et al. |
| 5,475,196 A | 12/1995 | Lisec |
| 5,484,325 A | 1/1996 | Shank |
| 5,505,653 A | 4/1996 | Nedo et al. |
| 5,508,596 A | 4/1996 | Olsen |
| 5,509,849 A | 4/1996 | Spears, Jr. |
| 5,524,821 A | 6/1996 | Yie et al. |
| 5,557,154 A | 9/1996 | Erhart |
| 5,564,184 A | 10/1996 | Dinh |
| 5,564,469 A | 10/1996 | Tremoulet, Jr. et al. |
| 5,577,390 A | 11/1996 | Kaido et al. |
| 5,616,067 A | 4/1997 | Goenka |
| 5,636,789 A | 6/1997 | Shook |

(56) References Cited

U.S. PATENT DOCUMENTS

| | | |
|---|---|---|
| 5,637,030 A | 6/1997 | Chopra et al. |
| 5,643,058 A | 7/1997 | Erichsen et al. |
| 5,649,694 A | 7/1997 | Buck |
| 5,679,058 A | 10/1997 | Rhoades |
| 5,685,190 A | 11/1997 | Yamamoto et al. |
| 5,704,824 A | 1/1998 | Hashish et al. |
| 5,722,688 A | 3/1998 | Garcia |
| 5,727,773 A | 3/1998 | Dunnigan |
| 5,730,358 A | 3/1998 | Raghavan et al. |
| 5,730,635 A | 3/1998 | De Haas et al. |
| 5,752,313 A | 5/1998 | Gaffaney et al. |
| 5,759,086 A | 6/1998 | Klingel |
| 5,771,873 A | 6/1998 | Potter et al. |
| 5,794,858 A | 8/1998 | Munoz |
| 5,799,688 A | 9/1998 | Yie |
| 5,800,134 A | 9/1998 | Hasegawa et al. |
| 5,800,231 A | 9/1998 | De Haas et al. |
| 5,800,246 A | 9/1998 | Tomioka |
| 5,806,390 A | 9/1998 | Pomerleau et al. |
| 5,831,403 A | 11/1998 | Kanki et al. |
| 5,837,921 A | 11/1998 | Rinaldi et al. |
| 5,848,880 A | 12/1998 | Helmig |
| 5,851,139 A | 12/1998 | Xu |
| 5,856,631 A | 1/1999 | Julien |
| 5,876,267 A | 3/1999 | Kanda |
| 5,892,345 A | 4/1999 | Olsen |
| 5,904,297 A | 5/1999 | Kendrick, Jr. et al. |
| 5,908,349 A | 6/1999 | Warehime |
| 5,916,321 A | 6/1999 | Holmes |
| 5,924,853 A | 7/1999 | Pacht |
| 5,927,329 A | 7/1999 | Yie |
| 5,948,332 A | 9/1999 | Prenger |
| 5,970,996 A | 10/1999 | Markey et al. |
| 5,975,429 A | 11/1999 | Jezek |
| 5,975,864 A | 11/1999 | De Santis et al. |
| 5,979,945 A | 11/1999 | Hitachi et al. |
| 5,992,904 A | 11/1999 | Hitachi et al. |
| 6,077,152 A | 6/2000 | Warehime |
| 6,083,001 A | 7/2000 | Deardon et al. |
| 6,098,677 A | 8/2000 | Wegman et al. |
| 6,099,388 A | 8/2000 | Fritsch et al. |
| 6,120,351 A | 9/2000 | Zeng |
| 6,121,744 A | 9/2000 | Hoda et al. |
| 6,126,524 A | 10/2000 | Shepherd |
| 6,136,386 A | 10/2000 | Nakahigashi et al. |
| 6,139,288 A | 10/2000 | Karasawa |
| 6,152,014 A | 11/2000 | Willimczik |
| 6,155,092 A | 12/2000 | Sahlem |
| 6,155,245 A | 12/2000 | Zanzuri |
| 6,162,031 A | 12/2000 | Tremoulet |
| 6,163,955 A | 12/2000 | Tsai |
| 6,168,503 B1 | 1/2001 | Pao et al. |
| 6,171,070 B1 | 1/2001 | Mitake |
| 6,213,095 B1 | 4/2001 | Asada et al. |
| 6,220,529 B1 | 4/2001 | Xu |
| 6,227,087 B1 | 5/2001 | Thorson et al. |
| 6,227,768 B1 | 5/2001 | Higuchi et al. |
| 6,241,492 B1 | 6/2001 | Pacht |
| 6,244,927 B1 | 6/2001 | Zeng |
| 6,276,993 B1 | 8/2001 | Miller |
| 6,279,363 B1 | 8/2001 | Averbuch et al. |
| 6,280,302 B1 | 8/2001 | Hashish et al. |
| 6,283,833 B1 | 9/2001 | Pao et al. |
| 6,299,510 B1 | 10/2001 | Massenburg |
| 6,328,638 B1 | 12/2001 | Hopkins et al. |
| 6,354,126 B1 | 3/2002 | Small et al. |
| 6,361,416 B1 | 3/2002 | Hopkins et al. |
| 6,379,214 B1 | 4/2002 | Stewart et al. |
| 6,408,826 B2 | 6/2002 | Asada et al. |
| 6,415,820 B1 | 7/2002 | Gluf, Jr. |
| 6,425,804 B1 | 7/2002 | Petit et al. |
| 6,425,805 B1 | 7/2002 | Massa et al. |
| 6,430,787 B1 | 8/2002 | Becan et al. |
| 6,431,465 B2 | 8/2002 | Yie |
| 6,443,705 B1 | 9/2002 | Munoz |
| 6,450,546 B1 | 9/2002 | Montgomery et al. |
| 6,497,219 B2 | 12/2002 | Natsume |
| 6,533,640 B1 | 3/2003 | Nopwaskey et al. |
| 6,533,643 B1 | 3/2003 | Feng |
| 6,540,586 B2 | 4/2003 | Sciulli |
| 6,544,012 B1 | 4/2003 | Blume |
| 6,548,173 B2 | 4/2003 | Erdemir et al. |
| 6,588,724 B2 | 7/2003 | Yie |
| 6,619,099 B2 | 9/2003 | Barjesteh |
| 6,619,570 B1 | 9/2003 | Ericksen et al. |
| 6,622,612 B2 | 9/2003 | Notzon |
| 6,676,039 B2 | 1/2004 | Lindsey et al. |
| 6,684,133 B2 | 1/2004 | Frye-Hammelmann et al. |
| 6,705,921 B1 | 3/2004 | Shepherd |
| 6,752,685 B2 | 6/2004 | Ulrich et al. |
| 6,766,216 B2 | 7/2004 | Erichsen et al. |
| 6,802,541 B2 | 10/2004 | Hopinks et al. |
| 6,810,615 B2 | 11/2004 | Hermanson et al. |
| 6,819,974 B1 | 11/2004 | Coleman et al. |
| 6,852,002 B2 | 2/2005 | Stewart et al. |
| 6,860,517 B2 | 3/2005 | Sanders |
| 6,870,346 B2 | 3/2005 | Davidov |
| 6,879,415 B2 | 4/2005 | Kurosawa |
| 6,913,447 B2 | 7/2005 | Fox et al. |
| 6,922,605 B1 | 7/2005 | Olsen |
| 6,931,776 B2 | 8/2005 | Wagner et al. |
| 6,932,285 B1 | 8/2005 | Zeng |
| 6,959,908 B2 | 11/2005 | Isbitsky |
| 6,960,069 B2 | 11/2005 | Maruta et al. |
| 6,970,793 B2 | 11/2005 | Pearson et al. |
| 6,979,125 B2 | 12/2005 | Vicars |
| 7,033,256 B2 | 4/2006 | Miller |
| 7,035,708 B1 | 4/2006 | Olsen |
| 7,040,959 B1 | 5/2006 | Panuska et al. |
| 7,074,112 B2 | 7/2006 | Olsen |
| 7,083,124 B2 | 8/2006 | Bednorz et al. |
| 7,094,135 B2 | 8/2006 | Chisum et al. |
| 7,108,585 B1 | 9/2006 | Dorman et al. |
| 7,121,812 B2 | 10/2006 | Forrest |
| 7,162,943 B1 | 1/2007 | Reitmeyer et al. |
| 7,165,396 B2 | 1/2007 | Zumbusch |
| 7,207,868 B2 | 4/2007 | Takehara et al. |
| 7,225,660 B1 | 6/2007 | Ledebur |
| 7,247,006 B2 | 7/2007 | Hopkins et al. |
| 7,357,697 B2 | 4/2008 | Massa et al. |
| 7,367,789 B2 | 5/2008 | Raghavan et al. |
| 7,383,896 B2 | 6/2008 | Tibbitts |
| 7,419,418 B2 | 9/2008 | Alberts et al. |
| 7,464,630 B2 | 12/2008 | Knaupp et al. |
| 7,465,215 B2 | 12/2008 | Shimizu et al. |
| 7,485,027 B2 | 2/2009 | Miller |
| 7,523,694 B2 | 4/2009 | Aday et al. |
| 7,537,019 B2 | 5/2009 | Ting et al. |
| 7,544,112 B1 | 6/2009 | Miller et al. |
| 7,560,892 B2 | 7/2009 | Shibaski et al. |
| 7,585,201 B2 | 9/2009 | Kanai et al. |
| 7,594,614 B2 | 9/2009 | Vijay et al. |
| 7,703,363 B2 | 4/2010 | Knaupp et al. |
| 7,748,750 B2 | 7/2010 | Raghavan et al. |
| 7,757,786 B2 | 7/2010 | Harder et al. |
| 7,815,490 B2 | 10/2010 | Liu |
| 7,818,986 B1 | 10/2010 | Parker et al. |
| 7,823,264 B1 * | 11/2010 | Halling ............... F16J 15/0887 29/451 |
| 7,832,481 B2 | 11/2010 | Martindale |
| 7,896,726 B1 | 3/2011 | Miller et al. |
| 7,905,711 B2 | 3/2011 | Mochizuki et al. |
| 7,917,017 B2 | 3/2011 | Kanamori |
| 7,938,713 B2 | 5/2011 | Trieb et al. |
| 7,946,147 B2 | 5/2011 | Shimai et al. |
| 8,024,068 B2 | 9/2011 | Gray |
| 8,123,591 B2 | 2/2012 | Olsen |
| 8,240,634 B2 | 8/2012 | Jarchau et al. |
| 8,267,672 B2 | 9/2012 | Kellar et al. |
| 8,277,206 B2 | 10/2012 | Raghavan et al. |
| 8,308,525 B2 | 11/2012 | Hashish et al. |
| 8,322,997 B2 | 12/2012 | Auer et al. |
| 8,342,912 B2 | 1/2013 | Funatsu |
| 8,401,692 B2 | 3/2013 | Knaupp et al. |

(56) References Cited

U.S. PATENT DOCUMENTS

| | | |
|---|---|---|
| 8,439,726 B2 | 5/2013 | Miller |
| 8,475,230 B2 | 7/2013 | Summers et al. |
| 8,534,787 B2 | 9/2013 | Yafe |
| 8,541,710 B2 | 9/2013 | Brandt et al. |
| 8,573,244 B2 | 11/2013 | Taylor |
| 8,593,086 B2 | 11/2013 | Hay et al. |
| 8,651,920 B2 | 2/2014 | Hashish |
| 8,821,213 B2 | 9/2014 | Liu et al. |
| 8,892,236 B2 | 11/2014 | Olsen |
| 8,904,912 B2 | 12/2014 | Raghavan et al. |
| 8,910,409 B1 | 12/2014 | Fonte |
| 8,920,213 B2 | 12/2014 | Liu |
| 8,984,926 B2 | 3/2015 | Davidsen |
| 9,003,955 B1 | 4/2015 | Stang et al. |
| 9,011,204 B2 | 4/2015 | Raghavan et al. |
| 9,044,873 B2 | 6/2015 | Guglielmetti et al. |
| 9,050,704 B1 | 6/2015 | Liu et al. |
| 9,067,331 B2 | 6/2015 | Stang |
| 9,090,808 B1 | 7/2015 | Liu et al. |
| 9,095,955 B2 | 8/2015 | Raghavan et al. |
| 9,108,297 B2 | 8/2015 | Schubert et al. |
| 9,138,863 B2 | 9/2015 | Schubert et al. |
| 9,163,617 B2 | 10/2015 | Mann |
| 9,272,437 B2 | 3/2016 | Hashish et al. |
| 9,273,682 B2 | 3/2016 | Stang |
| 9,283,656 B2 | 3/2016 | Schubert et al. |
| 9,309,873 B2 | 4/2016 | Roll |
| 9,375,771 B2 | 6/2016 | Fonte |
| 9,492,908 B2 | 11/2016 | Schubert et al. |
| 9,574,684 B1 | 2/2017 | Fonte |
| 9,586,306 B2 | 3/2017 | Zhang et al. |
| 9,610,674 B2 | 4/2017 | Raghavan et al. |
| 9,636,799 B2 | 5/2017 | Liu et al. |
| 9,638,330 B2 * | 5/2017 | Itou ............... F16J 15/38 |
| 9,638,357 B1 | 5/2017 | Raghavan et al. |
| 9,649,744 B2 | 5/2017 | Raghavan et al. |
| 9,658,613 B2 | 5/2017 | Henning et al. |
| 9,720,399 B2 | 8/2017 | Henning et al. |
| 9,727,051 B2 | 8/2017 | Henning et al. |
| 9,772,620 B2 | 9/2017 | Henning et al. |
| 9,810,205 B2 | 11/2017 | Raghavan et al. |
| 9,827,649 B2 | 11/2017 | Schubert et al. |
| 9,884,406 B2 | 2/2018 | Hashish et al. |
| 9,891,617 B2 | 2/2018 | Henning et al. |
| 9,976,675 B1 | 5/2018 | Raghavan et al. |
| 9,989,954 B2 | 6/2018 | Henning et al. |
| 10,010,999 B2 | 7/2018 | Raghavan et al. |
| 10,048,676 B2 | 8/2018 | Henning et al. |
| 10,054,118 B2 | 8/2018 | Hopkins |
| 10,146,209 B2 | 12/2018 | Henning et al. |
| 10,209,107 B2 | 2/2019 | Oki |
| 10,564,627 B2 | 2/2020 | Henning et al. |
| 10,606,240 B2 | 2/2020 | Henning et al. |
| 10,642,252 B2 | 5/2020 | Henning et al. |
| 10,656,622 B2 | 5/2020 | Henning et al. |
| 10,675,733 B2 | 6/2020 | Zhang et al. |
| 10,780,551 B2 | 9/2020 | Zhang et al. |
| 10,801,651 B2 | 10/2020 | Olsen et al. |
| 10,808,688 B1 | 10/2020 | Raghavan et al. |
| 10,859,994 B2 | 12/2020 | Chandler et al. |
| 10,864,613 B2 | 12/2020 | Raghavan et al. |
| 10,955,078 B2 | 3/2021 | Mann |
| 10,983,503 B2 | 4/2021 | Henning et al. |
| 10,990,080 B2 | 4/2021 | Henning et al. |
| 11,125,360 B2 | 9/2021 | Raghavan et al. |
| 11,224,987 B1 | 1/2022 | Guglielmetti |
| 11,554,461 B1 | 1/2023 | Miles et al. |
| 11,577,366 B2 | 2/2023 | Schubert et al. |
| 11,693,387 B2 | 7/2023 | Henning et al. |
| 2001/0002562 A1 | 6/2001 | Moutafis et al. |
| 2001/0030245 A1 | 10/2001 | Lindsey et al. |
| 2002/0056347 A1 | 5/2002 | Signey et al. |
| 2003/0034122 A1 | 2/2003 | Asai |
| 2003/0057295 A1 | 3/2003 | Helmig |
| 2003/0067168 A1 | 4/2003 | Sches et al. |
| 2003/0085295 A1 | 5/2003 | Dijkman et al. |
| 2003/0106591 A1 | 6/2003 | Saurwein et al. |
| 2003/0106594 A1 | 6/2003 | Saurwein et al. |
| 2003/0107021 A1 | 6/2003 | Saurwein et al. |
| 2003/0122376 A1 | 7/2003 | Hopkins et al. |
| 2003/0141617 A1 | 7/2003 | Prevotat et al. |
| 2003/0146229 A1 | 8/2003 | Munoz |
| 2003/0148709 A1 | 8/2003 | Anand et al. |
| 2003/0065424 A1 | 9/2003 | Erichsen et al. |
| 2004/0107810 A1 | 6/2004 | Sciulli et al. |
| 2004/0108000 A1 | 6/2004 | Raghavan et al. |
| 2004/0198179 A1 | 10/2004 | Gadd |
| 2005/0017091 A1 | 1/2005 | Olsen et al. |
| 2005/0173815 A1 | 8/2005 | Mueller |
| 2005/0252352 A1 | 11/2005 | Tateiwa |
| 2006/0223423 A1 | 10/2006 | Dorfman et al. |
| 2006/0237672 A1 | 10/2006 | Moreno et al. |
| 2007/0009367 A1 | 1/2007 | Tischler et al. |
| 2007/0021039 A1 | 1/2007 | Haslett |
| 2007/0063066 A1 | 3/2007 | Vijay et al. |
| 2007/0131455 A1 | 6/2007 | Blange |
| 2007/0155289 A1 | 7/2007 | Miller |
| 2007/0186604 A1 | 8/2007 | Koppensteiner |
| 2007/0203858 A1 | 8/2007 | Olsen |
| 2007/0218808 A1 | 9/2007 | Shimizu et al. |
| 2007/0252340 A1 * | 11/2007 | Karl ............... F16J 15/28 |
| | | 277/534 |
| 2007/0267996 A1 | 11/2007 | Shibasaki et al. |
| 2008/0000065 A1 | 1/2008 | Ganguly et al. |
| 2008/0019851 A1 | 1/2008 | Hopkins et al. |
| 2008/0060493 A1 | 3/2008 | Liu |
| 2008/0110229 A1 | 5/2008 | Badlani et al. |
| 2008/0110311 A1 | 5/2008 | Stangherlin |
| 2008/0169581 A1 | 7/2008 | Fukushima et al. |
| 2008/0282855 A1 | 11/2008 | Kanai |
| 2009/0013839 A1 | 1/2009 | Kanai et al. |
| 2009/0064832 A1 | 3/2009 | Caretta et al. |
| 2009/0139595 A1 | 6/2009 | Kato et al. |
| 2009/0151701 A1 | 6/2009 | Kato et al. |
| 2009/0258582 A1 | 10/2009 | Miller |
| 2009/0272245 A1 | 11/2009 | Voice et al. |
| 2009/0288532 A1 | 11/2009 | Hashish |
| 2009/0318064 A1 | 12/2009 | Hashish |
| 2010/0003894 A1 | 1/2010 | Miller et al. |
| 2010/0064870 A1 | 3/2010 | Olsen |
| 2010/0066786 A1 | 3/2010 | Yafe |
| 2010/0124872 A1 | 5/2010 | Hashish et al. |
| 2010/0166573 A1 | 7/2010 | Magami et al. |
| 2010/0199740 A1 | 8/2010 | Muschalik et al. |
| 2010/0230953 A1 | 9/2010 | Baylot et al. |
| 2010/0257913 A1 | 10/2010 | Storm, Jr. et al. |
| 2010/0269593 A1 | 10/2010 | Moser et al. |
| 2010/0310384 A1 | 12/2010 | Stephenson et al. |
| 2010/0326271 A1 | 12/2010 | Stang |
| 2011/0005067 A1 | 1/2011 | McDaniel et al. |
| 2011/0011253 A1 | 1/2011 | Fonte |
| 2011/0084476 A1 | 4/2011 | Nishida |
| 2011/0135505 A1 | 6/2011 | Kieninger et al. |
| 2011/0232355 A1 | 9/2011 | Evans et al. |
| 2011/0269382 A1 | 11/2011 | Deleris |
| 2011/0297269 A1 | 12/2011 | Pilon et al. |
| 2012/0021676 A1 | 1/2012 | Schubert et al. |
| 2012/0085211 A1 | 4/2012 | Liu et al. |
| 2012/0091382 A1 | 4/2012 | Yie |
| 2012/0186518 A1 | 7/2012 | Herre et al. |
| 2012/0196516 A1 | 8/2012 | Funatsu et al. |
| 2012/0199218 A1 | 8/2012 | Gioberti et al. |
| 2012/0201706 A1 | 8/2012 | Liu et al. |
| 2012/0217011 A1 | 8/2012 | Dotson et al. |
| 2012/0238188 A1 | 9/2012 | Miller |
| 2012/0247296 A1 | 10/2012 | Stang et al. |
| 2012/0252325 A1 | 10/2012 | Schubert et al. |
| 2012/0252326 A1 | 10/2012 | Schubert et al. |
| 2012/0272764 A1 | 11/2012 | Pendleton |
| 2012/0282845 A1 | 11/2012 | Whang et al. |
| 2013/0005225 A1 | 1/2013 | Russo |
| 2013/0112074 A1 | 5/2013 | Small |
| 2013/0167697 A1 | 7/2013 | Reukers |
| 2013/0267152 A1 | 10/2013 | Tera et al. |

(56) References Cited

U.S. PATENT DOCUMENTS

| | | | |
|---|---|---|---|
| 2014/0015202 A1* | 1/2014 | Chacko | F04B 1/0448 277/500 |
| 2014/0015245 A1 | 1/2014 | Chiu | |
| 2014/0045409 A1 | 2/2014 | Zhang et al. | |
| 2014/0051334 A1 | 2/2014 | Raghavan et al. | |
| 2014/0087631 A1 | 3/2014 | Raghavan et al. | |
| 2014/0124184 A1 | 5/2014 | Tokura | |
| 2014/0273768 A1 | 9/2014 | Guglielmetti et al. | |
| 2014/0377485 A1 | 12/2014 | Berger et al. | |
| 2015/0053075 A1 | 2/2015 | Rabhi | |
| 2015/0082606 A1 | 3/2015 | Nakajima et al. | |
| 2015/0360344 A1 | 12/2015 | Raghavan et al. | |
| 2016/0298614 A1 | 10/2016 | Gaillard | |
| 2017/0165810 A1 | 6/2017 | Zhang et al. | |
| 2017/0190021 A1 | 7/2017 | Zhang et al. | |
| 2017/0297168 A1 | 10/2017 | Raghavan et al. | |
| 2018/0150049 A1 | 5/2018 | Schranz et al. | |
| 2018/0161958 A1 | 6/2018 | Schubert et al. | |
| 2018/0320802 A1 | 11/2018 | Raghavan et al. | |
| 2018/0364679 A1 | 12/2018 | Henning et al. | |
| 2019/0015928 A1 | 1/2019 | Hagenlocher et al. | |
| 2019/0101894 A1 | 4/2019 | Henning et al. | |
| 2019/0249805 A1 | 8/2019 | Olsen et al. | |
| 2020/0007254 A1 | 1/2020 | Hay et al. | |
| 2020/0406424 A1 | 12/2020 | Zhang et al. | |
| 2021/0046610 A1 | 2/2021 | Schubert et al. | |
| 2021/0154799 A1 | 5/2021 | Dean, Jr. et al. | |
| 2021/0187778 A1 | 6/2021 | Denney et al. | |
| 2021/0192922 A1 | 6/2021 | Vandergon et al. | |
| 2021/0291332 A1 | 9/2021 | Vandergon et al. | |
| 2021/0299904 A1 | 9/2021 | Osterhouse | |
| 2021/0301936 A1 | 9/2021 | Osterhouse et al. | |
| 2022/0057774 A1 | 2/2022 | Vandergon et al. | |
| 2023/0120907 A1 | 4/2023 | Miles et al. | |
| 2023/0143795 A1 | 5/2023 | Schubert et al. | |
| 2023/0191561 A1 | 6/2023 | Guglielmetti et al. | |
| 2023/0191644 A1 | 6/2023 | Guglielmetti et al. | |

FOREIGN PATENT DOCUMENTS

| | | | |
|---|---|---|---|
| CN | 201827039 U | 5/2011 | |
| CN | 102507171 A | 6/2012 | |
| CN | 102632373 A | 8/2012 | |
| CN | 202955386 U | 5/2013 | |
| DE | 4343820 A1 | 6/1995 | |
| DE | 10214251 C1 | 8/2003 | |
| DE | 202013104815.1 U1 | 2/2014 | |
| EP | 0165690 A2 | 12/1985 | |
| EP | 0391489 A1 | 10/1990 | |
| EP | 1116543 A2 | 7/2001 | |
| EP | 2236893 A2 | 10/2010 | |
| GB | 1078145 A | 8/1967 | |
| GB | 2198975 A | 6/1988 | |
| JP | 61222677 A | 10/1986 | |
| JP | 2003088924 A | 3/2003 | |
| JP | 2012157956 A | 8/2012 | |
| WO | 94025209 A1 | 11/1994 | |
| WO | 02085572 A1 | 10/2002 | |
| WO | 03011524 A1 | 2/2003 | |
| WO | 2009050251 A2 | 4/2009 | |
| WO | 2011042244 A2 | 4/2011 | |
| WO | 2013109473 A1 | 7/2013 | |
| WO | 2013109474 A1 | 7/2013 | |
| WO | WO-2014054472 A1 * | 4/2014 | F16J 15/166 |

OTHER PUBLICATIONS

Hu et al., Computer Modeling and Optimization of Swage Autofrettage Process of a Thick-Walled Cylinder Incorporating Bauschinger Effect, Jan. 14, 2014, American Transactions on Engineering & Applied Sciences, vol. 3, pp. 31-63.

His Esdu, "Guide to Stress Concentration Data," The Royal Aeronautical Society—The Institution of Mechanical Engineers, 64001 Issued Jun. 1976.

Hydraulics & Pneumatics—Serving Fluid Power and Motion Control Engines Worldwide, http://www.hydraulicspneumatics.com/200/TechZone/FittingsCouplin/Article/True/6421/ , 2010, 2 pages.

Pilkey, Walter D., "Peterson's Stress Concentration Factors," Second Edition, John Wiley & Sons, Inc., Copyright 1997, pp. 175-185, 204-207, 211-216, 256-257, 284, 287-301, 318-322, 326, 362, 370.

Stephens, Ralph, et al., "Metal Fatigue in Engineering," Second Edition, John Wiley & Sons, Inc., Copyright 2001, Chapter 7, pp. 186-193.

Stress Concentration—Wikipedia, http://wikipedia.org/wiki/Stress_concentration, accessed Oct. 5, 2011, 3 pages.

Timoshenko, S. P., et al., "Theory of Elasticity," Third Edition, McGraw Hill Book Company, Copyright 1934, pp. 90-97, 181-194, 209-217.

Genuine Flow Parts—87K High-pressure Cylinder, copyright 2021 Flow International Corporation, A Shape Technologies Company, https://flowparts.com/collections/high-pressure-components/products/cylinder-hp-cartridge-87k-2-0-intn [last accessed Mar. 29, 2021], 4 pages.

Waterjet cutting head parts, 60k high pressure HP Cylinder body for Jet Edge / sunrise water jet head intensifier pump SR20004, copyright 2010-2020 AliExpress.com, https://www.aliexpress.com/item/33039960455.html [last accessed Mar. 29, 2021], 5 pages.

Davidson et al, "Residual Stresses in Thick-walled Cylinders Resulting from Mechanically Induced Overstrain," Experimental Mechanics, Nov. 1963, pp. 253-262.

Gibson et al., "Investigation of Residual Stress Development During Swage Autofrettage, Using Finite Element Analysis," Proceedings of the ASME 2009 International Mechanical Engineering Congress & Exposition, Nov. 13-19, 2009, 8 pages.

O'Hara, Peter G., "Analysis of the Swage Autofrettage Process," Technical Report ARCCB-TR-92016, U.S. Army Armament Research, Development and Engineering Center, Close Combat Armaments Center, Benet Laboratories, Watervliet, N.Y., Apr. 1992, 22 pages.

Gibson, Michael C., "Determination of Residual Stress Distributions in Autofrettaged Thick-Walled Cylinders," Department of Engineering Systems and Management Defense College of Management and Technology, Cranfield University, Apr. 2008, 302 pages.

Perl et al., "Is There an 'Ultimate' Autofrettage Process?," Journal of Pressure Vessel Technology, vol. 134, Aug. 2012, 5 pages.

"Fox Solids Conveying Eductors," http://www.flowmeterdirectory.com/solid_conveying_eductor.html, last accessed May 24, 2011, 2 pages.

OMAX Accessory Specifications A-Jet, Precision Abrasive Waterjet Accessories, Jan. 2010.

Savin, G. N., "Stress Concentration Around Holdes," Pergamon Press, 1961, pp. 72-80, 104-112, 123-142 and 205-225.

Hashish, M., "Waterjet Machine Tool of the Future," $9^{th}$ American Waterjet Conference, Aug. 23-26, 1997, Dearborn, Michigan, Paper No. 58, 15 pages.

Miller, D.S., "New Abrasive Waterjet Systems to Compete with Lasers," 2005 WJTA American Waterjet Conference, Aug. 21-23, 2005, Houston, Texas, 11 pages.

* cited by examiner

HIGH-PRESSURE SEAL FOR A LIQUID JET CUTTING SYSTEM

CROSS-REFERENCE TO RELATED APPLICATIONS INCORPORATED BY REFERENCE

The present application claims priority to U.S. Provisional App. No. 62/994,156, titled HIGH PRESSURE SEAL FOR A LIQUID JET CUTTING SYSTEM, which was filed on Mar. 24, 2020, and is incorporated herein by reference in its entirety.

TECHNICAL FIELD

The present disclosure is generally related to high-pressure seals for liquid jet cutting systems.

BACKGROUND

Pumps of liquid jet cutting systems typically include a dynamic seal assembly to seal the gap between a plunger and a cylinder and allow the plunger to reciprocate. In the field of liquid jet cutting systems it is common to use an Ultra-High-Molecular-Weight PolyEthylene (hereinafter UHMWPE) seal with an O-ring fitted on it to accomplish this sealing of the gap. This UHMWPE seal is typically supported against the high pressures generated in the cylinder by a backup ring that fits closely to the plunger. Two common causes of failure in liquid jet cutting pumps include extrusion of the UHMWPE material past the inner diameter of the backup ring (e.g., between the backup ring and the plunger), and extrusion of the UHMWPE material past the outer diameter of the backup ring (e.g., between the backup ring and the cylinder).

DETAILED DESCRIPTION

The following disclosure describes various embodiments of seal assemblies for use with liquid jet cutting systems. These seal assemblies can be configured to operate in high-pressure environments (e.g., with pressures over 40,000 psi and reaching up to 120,000 psi, and/or between 20,000 and 100,000 psi). The seal assemblies can include an annular seal, a backup ring, and a hoop ring positioned between the annular seal and the backup ring. The hoop ring can have a triangular cross-section, with first and second angled surfaces (e.g., tapered surfaces) opposing angled faces (e.g., tapered faces) of the annular seal and the backup ring, respectively. An angle between the first angled surface and the second angled surface can be between 50° and 80° (e.g., approximately 60°). In some embodiments, an angle between the second angled surface and a longitudinal axis of the seal assembly is between 50° and 80° (e.g., approximately 60°).

In the Figures, identical reference numbers identify identical, or at least generally similar, elements. To facilitate the discussion of any particular element, the most significant digit or digits of any reference number refers to the Figure in which that element is first introduced. For example, cylinder 222 is first introduced and discussed with reference to FIG. 2.

Figure 1:
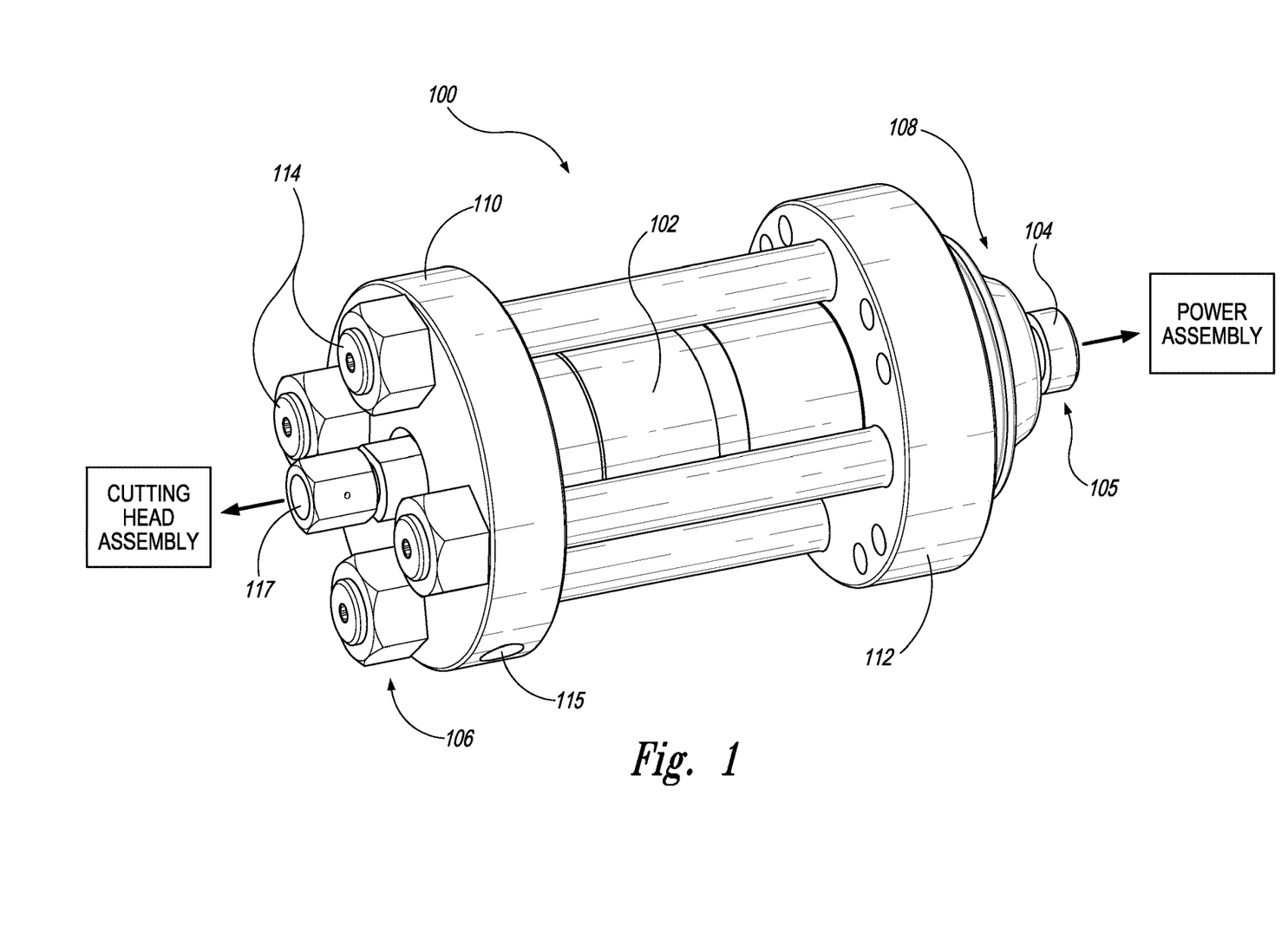
FIG. 1 is an isometric view of a liquid pressurization assembly configured in accordance with embodiments of the present technology.

FIG. 1 is an isometric view of a liquid pressurization assembly 100 configured in accordance with embodiments of the present technology. The liquid pressurization assembly 100 can include a cylinder assembly 102. The cylinder assembly 102 can be configured to receive at least a portion of a plunger 104 configured to reciprocate within the cylinder assembly 102 and pressurize liquid for output to a liquid jet cutting head assembly (not shown) via an inlet/outlet end portion 106. The plunger 104 can be reciprocated by a power assembly (not shown) operably coupled to a dynamic end portion 108 of the liquid pressurization assembly 100. In some embodiments, the power assembly can include components of a linear intensifier pump, e.g., a piston operably contained within a hydraulic cylinder that is fixedly attached to the pressurization assembly 100 in a conventional manner. In other embodiments, the power assembly can include components of a rotary direct drive pump, e.g., a crankshaft and associated connecting rod contained within a crankcase fixedly attached to the pressurization assembly 100 in a conventional manner. In such embodiments, the power assembly applies reciprocating forces to a proximal end portion 105 of the plunger 104 which, in some embodiments, extends outside of the liquid pressurization assembly 100. The cylinder assembly 102 can be captured between two endcaps or other retaining structures; one endcap 110 positioned at or near the inlet/outlet end portion 106, and the other endcap 112 positioned at or near the dynamic end portion 108. The endcaps 110, 112 can be fixedly connected to each other via one or more bolts 114 or other fasteners or connection means. In operation, the liquid jet pressurization assembly can be configured to receive low-pressure liquid via an inlet 115, pressurize the low-pressure liquid, and output high-pressure liquid to the liquid jet assembly via an outlet 117.

Figure 2:
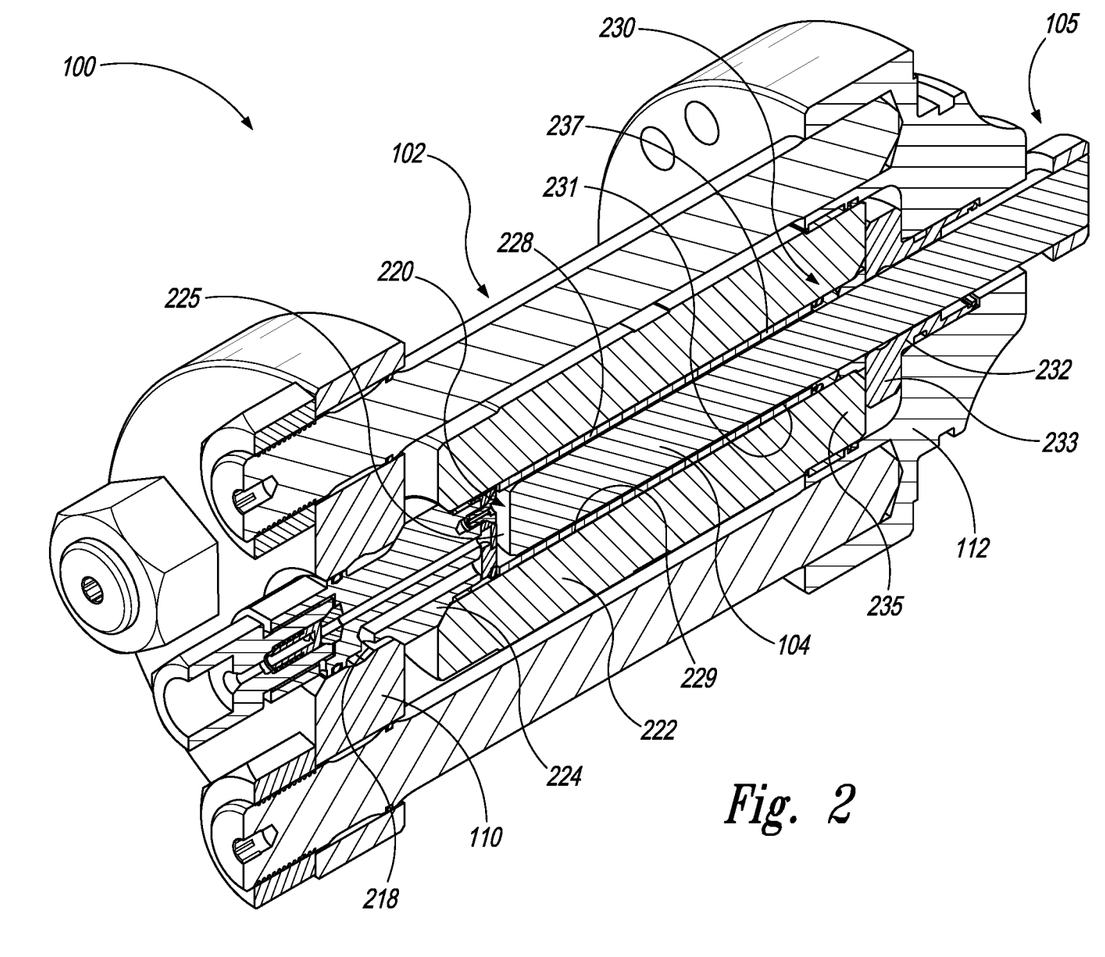
FIG. 2 is an isometric, side cross-sectional view of the liquid pressurization assembly of FIG. 1.

FIG. 2 is an isometric, side cross-sectional view of the liquid pressurization assembly 100 of FIG. 1 configured in accordance with embodiments of the present technology. The liquid pressurization assembly 100 can include a low-pressure liquid chamber 218 configured to receive low-pressure liquid from a liquid source (not shown) via the inlet 115. In operation, liquid from the low-pressure liquid chamber 218 is drawn into a high-pressure liquid chamber 220 via movement of the plunger 104 away from the inlet/outlet end portion 106. For example, the low-pressure liquid can be drawn through a check valve assembly 224 into the high-pressure liquid chamber 220 within the cylinder 222 between the check valve assembly 224 and a distal end 225 of the plunger 104. The plunger 104 then reciprocates to compress the liquid within the high-pressure liquid chamber 220 and then drive the high-pressure liquid outwardly through the check valve assembly 224 and onward to the liquid jet cutting head assembly via the outlet 117.

The cylinder assembly 102 can include spacer ring 228 (e.g., a sleeve) surrounding at least a portion of the plunger 104 as the plunger 104 reciprocates within the cylinder 222. In some embodiments, the spacer ring 228 is sized (e.g., via the inner and outer diameters of the spacer ring 228) to remain out of contact with the plunger 104 during operation. In other embodiments, the spacer ring 228 can be configured to reduce tilting and/or other non-axial movement of the plunger 104. The cylinder assembly 102 can also include a seal assembly 230 operably positioned proximate the dynamic end portion 108 and opposite the check valve assembly 224. The seal assembly 230 can be configured to reduce or eliminate leakage of high-pressure fluid through the space between the inner sidewall 229 of the cylinder 222 and the outer sidewall 231 of the plunger 104. In some embodiments, the seal assembly 230 is positioned at least partially within the space between the plunger 104 and the cylinder 222, in a portion of the cylinder 222 between a proximal end portion 237 of the spacer ring 228 and the endcap 112 on the dynamic end portion 108. The seal assembly 230 can be configured to operate in a high-pressure environment (e.g., with pressures over 40,000 psi and reaching up to 120,000 psi, and/or between 20,000 and 100,000 psi) The liquid pressurization assembly 100 can also include a collar 232 (e.g., a seal carrier or seal housing) inside of the endcap 112 on the dynamic end 108. At least a portion of the collar 232 (e.g., an annular flange portion 233) can be compressed between a proximal end portion 235 of the cylinder 222 and the endcap 112. In some embodiments, the collar 232 can form a seal between the plunger 104 and the endcap 112 and can abut the seal assembly 230. For example, the collar 232 can carry one or more O-rings, gaskets, or other elastomeric, flexible, and/or resilient structures configured to form a seal between the endcap 112 and the plunger 104.

Figure 3:
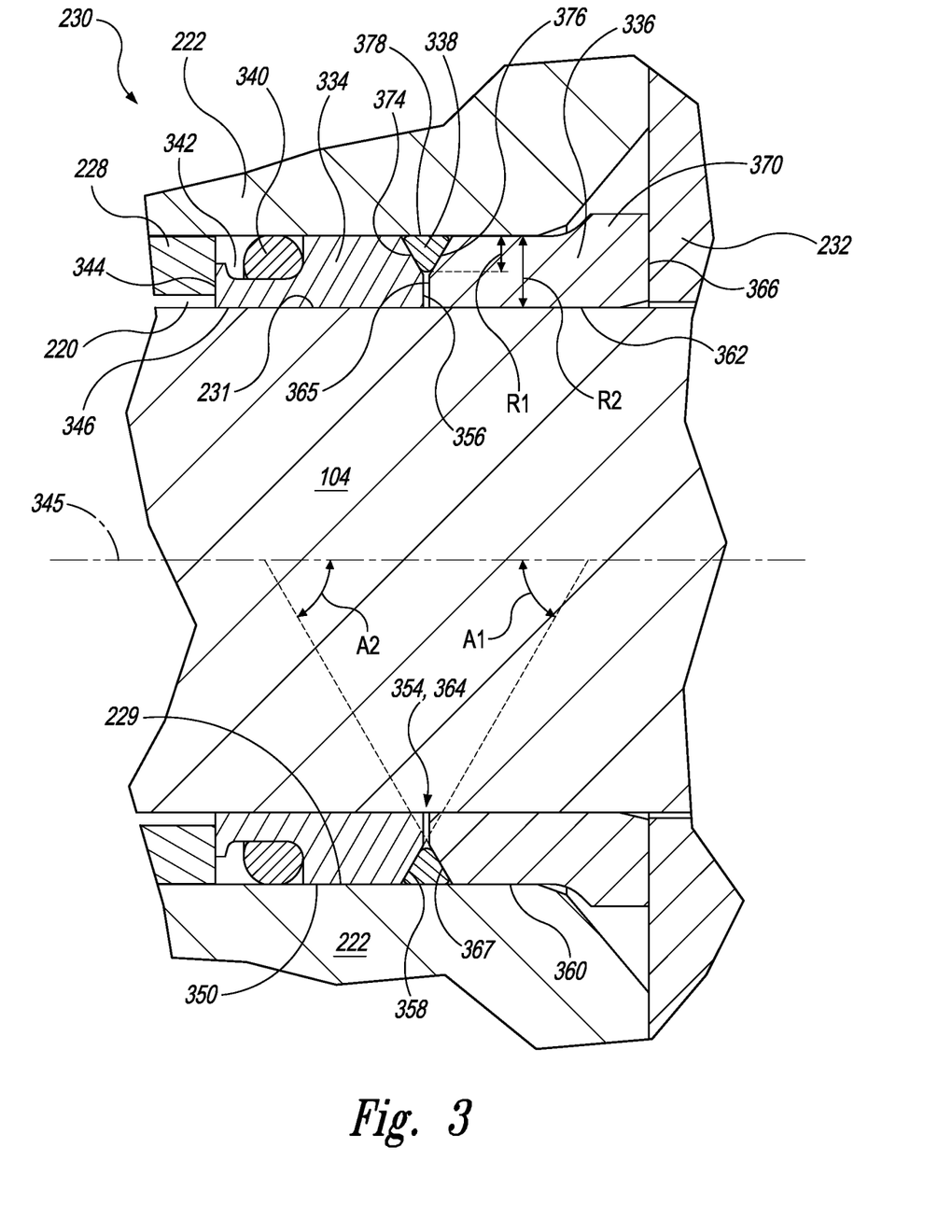
FIG. 3 is an enlarged, side cross-sectional view of a portion of the liquid pressurization assembly of FIG. 2 showing a seal assembly configured in accordance with embodiments of the present technology.

FIG. 3 is an enlarged, side cross-sectional view illustrating the seal assembly 230, configured in accordance with embodiments of the present technology. The seal assembly 230 can be positioned in an annular space between the inner sidewall 229 of the cylinder 222 and the outer sidewall 231 of the plunger 104, and is configured to inhibit or prevent high-pressure liquid from escaping the high-pressure liquid chamber 220 via the cylinder 222. In the illustrated embodiment, the seal assembly 230 includes an annular seal 334 (e.g., a circular or ring-shaped seal), a backup ring 336 positioned between the annular seal 334 and the collar 232 or endcap at the dynamic end portion 108, and a hoop ring 338 positioned between the annular seal 334 and the backup ring 336. In some embodiments, the seal assembly 230 can further include a gasket 340 (e.g., an O-ring) positioned in and/or against a groove 342, channel, step, or other feature of the annular seal 334. The gasket 340 can be configured to form a seal that inhibits or prevents high-pressure fluid from passing between the annular seal 334 and the inner sidewall 229 of the cylinder 222. One or more components of the seal assembly 230 described herein can be annular (e.g., circular) and have a constant cross-sectional shape when viewed in planes extending parallel to a longitudinal axis 345 of the plunger 104. Moreover, in the illustrated embodiment each of the components of the seal assembly 230 described above are coaxially aligned with each other and with the plunger 104 (e.g., the longitudinal axes of the components are coincident with each other and with the longitudinal axis 345 of the plunger 304).

The annular seal 334 can be constructed from a resilient, elastomeric, and/or flexible material. For example, in some embodiments the annular seal 334 can be constructed from UHMWPE. In other embodiments, the annular seal can be constructed from other suitable materials known in the art including, e.g., rubber, Teflon, etc. The seal has a first end portion 344 that is at least partially exposed to the high-pressure liquid chamber 220. In some embodiments, the first end portion 344 includes an annular surface that is planar and/or perpendicular to a longitudinal axis 345 of the plunger 104. An inner surface 346 of the annular seal 334 can contact an outer sidewall surface 231 of the plunger 104, and an outer surface 350 of the annular seal 334 can contact an inner sidewall 229 of the cylinder 222. The annular seal 334 has a second end portion 354 opposite the first end portion 344. The second end portion 354 of the annular seal 334 can include a first surface 356 (e.g., an annular face) and a second surface 358 extending radially outward from the first surface 356. In some embodiments, the first surface 356 of the second end portion 354 is planar and/or perpendicular to the longitudinal axis 345 of the plunger 104. The second surface 358 can be tapered such that a diameter of the second surface 358 increases in a direction away from the dynamic end portion 108 of the liquid pressurization assembly 100. In some embodiments, the second surface 358 can have a constant taper (e.g., it can be conical or frustoconical) or a non-constant taper (e.g., a concave or convex shape when viewed in a plane on which the longitudinal axis 345 of the plunger 104 lies). In some embodiments, the second surface 358 extends from the first surface 356 to the inner sidewall 229 of the cylinder 222.

The backup ring 336 can be positioned between the annular seal 334 and the collar 232/endcap 112 at the dynamic end 108 of the liquid pressurization assembly 100. An outer surface 360 of the backup ring 336, or a portion thereof, can contact the inner wall 229 of the cylinder 222. An inner surface 362 of the backup ring 336, or portion thereof, can contact an outer surface 231 of the plunger 104. The backup ring 336 can be constructed from a bronze alloy or other material appropriate for bearing against the plunger 104 while allowing the plunger 104 to reciprocate.

The backup ring 336 can have a first end portion 364 facing the annular seal 334. In some embodiments, the first end portion 364 of the backup ring 336 is a mirror image of the second end portion 354 of the annular seal 334 (e.g., across a plane perpendicular to the longitudinal axis 345 of the plunger 104). For example, the first end portion 364 of the backup ring 336 can include a first surface 365 facing the first surface 356 of the second end portion 354 of the annular seal 334. The first surface 365 of the first end portion 364 of the backup ring 336 can be identical or substantially identical to the first surface 356 of the second end portion of the annular seal 334. The first end portion 364 of the backup ring 336 can include a second surface 367 that is tapered in a direction opposite to the second surface 358 of the second end portion 354 of the annular seal 334. The second surface 367 of the first end portion 364 of the backup ring 336 can have a constant taper (e.g., it can be conical or frustoconical) or a non-constant taper (e.g., a concave or convex shape when viewed in a plane on which the longitudinal axis 345 of the plunger 104 lies). In some embodiments, the second surface 367 extends from the first surface 365 to the inner wall 229 of the cylinder 222.

A second end portion 366 of the backup ring 336, opposite the first end portion, can contact, abut, or otherwise engage the collar 232/endcap 112 of the dynamic end 108 of the liquid pressurization assembly 100. In some embodiments, the second end portion 366 of the backup ring 336 is flat, planar, and/or perpendicular to the longitudinal axis 345 of the plunger 104. The second end portion 366 of the backup ring 336 can include an outer flange 370 extending radially outward beyond the inner wall 229 of the cylinder 222. In some embodiments, the outer flange 370 is annular. In some embodiments, the outer flange 370 comprises a plurality of flange portions separated by one or more gaps along a circumference of the outer flange 370. The flange 370 can reduce or eliminate the risk that the backup ring 336 translates into the cylinder 102 from the installed position illustrated in FIG. 3.

With continued reference to FIG. 3, the seal assembly 230 includes a hoop ring 338 positioned in a cavity between the inner wall 229 of the cylinder 222, the second surface 358 of the second end portion 354 of the annular seal 334, and the second surface 367 of the first end portion 364 of the backup ring 336. The hoop ring 338 can have a radial thickness R1 between 33% to 66%, between 40% to 60%, between 45% to 55%, and/or approximately 50% of the radial clearance R2 between the inner surface of the cylinder 222 and the outer surface 231 of the plunger 104.

The hoop ring 338 can be constructed from a material having adequate strength and ductility to bear the loads applied by forces on the seal assembly 230. For example, in some embodiments, the hoop ring 338 can be constructed from an aluminum bronze alloy, a copper alloy, a stainless steel, brass, etc., and/or some other material or combination of materials.

The hoop ring 338 can have a generally triangular (e.g., an isosceles triangle, a right triangle, an equilateral triangle etc.) cross-section when viewed in a plane on which the longitudinal axis 345 of the plunger 104 lies. A first surface 374 of the hoop ring 338 can face the second surface 358 of the second end portion 354 of the annular seal 334. A second surface 376 of the hoop ring 338 can face the second surface 367 of the first end portion 364 of the backup ring 336. A third surface 378 (e.g., an outer surface) of the hoop ring 338 can face and contact the inner wall 229 of the cylinder 222.

The first and second surfaces 374, 376 of the hoop ring 338 can be parallel to or substantially parallel to the second surfaces 358, 367 of the second end portion 354 of the annular seal 334 and the first end portion 364 of the backup ring 336, respectively. In some embodiments, first and second surfaces 374, 376 of the hoop ring 338 are within 5° of parallel with the second surfaces 358, 367 of the annular seal 334 and backup ring 336. The angle A1 between the second surface 358 of the second end portion 354 of the annular seal 334 and the longitudinal axis 345 of the plunger 104 can be oblique. In some embodiments, the angle A1 is between 45° and 90°, between 50° and 80° and/or between 55° and 65°. In some embodiments, the angle A1 between the second surface 358 of the second end portion 354 of the annular seal 334 and the longitudinal axis 345 of the plunger 104 is approximately 60°. In some embodiments, the second surface 358 of the second end portion 354 of the annular seal 334 extends from the inner wall 229 of the cylinder 222 such that the second surface 358 has a radial thickness of greater than 50% of the radial clearance R2 between the inner surface of the cylinder 222 and the outer surface 231 of the plunger 104. For example, in embodiments where the angle A1 between the second surface 358 and the longitudinal axis 345 is greater than 60°, the second surface 358 may have a higher radial thickness than that illustrated in FIG. 3.

In some embodiments, the angle A2 between the second surface 367 of the first end portion 364 of the backup ring 336 and the longitudinal axis 345 of the plunger 104 is equal to or substantially equal to the angle A1 between the second surface 358 of the second end portion 354 of the annular seal 334 and the longitudinal axis 345 of the plunger 104. In some embodiments, the angle between the second surfaces 358, 367 is between 50° and 80°, between 58° and 64°, and/or approximately 60°.

Figure 4:
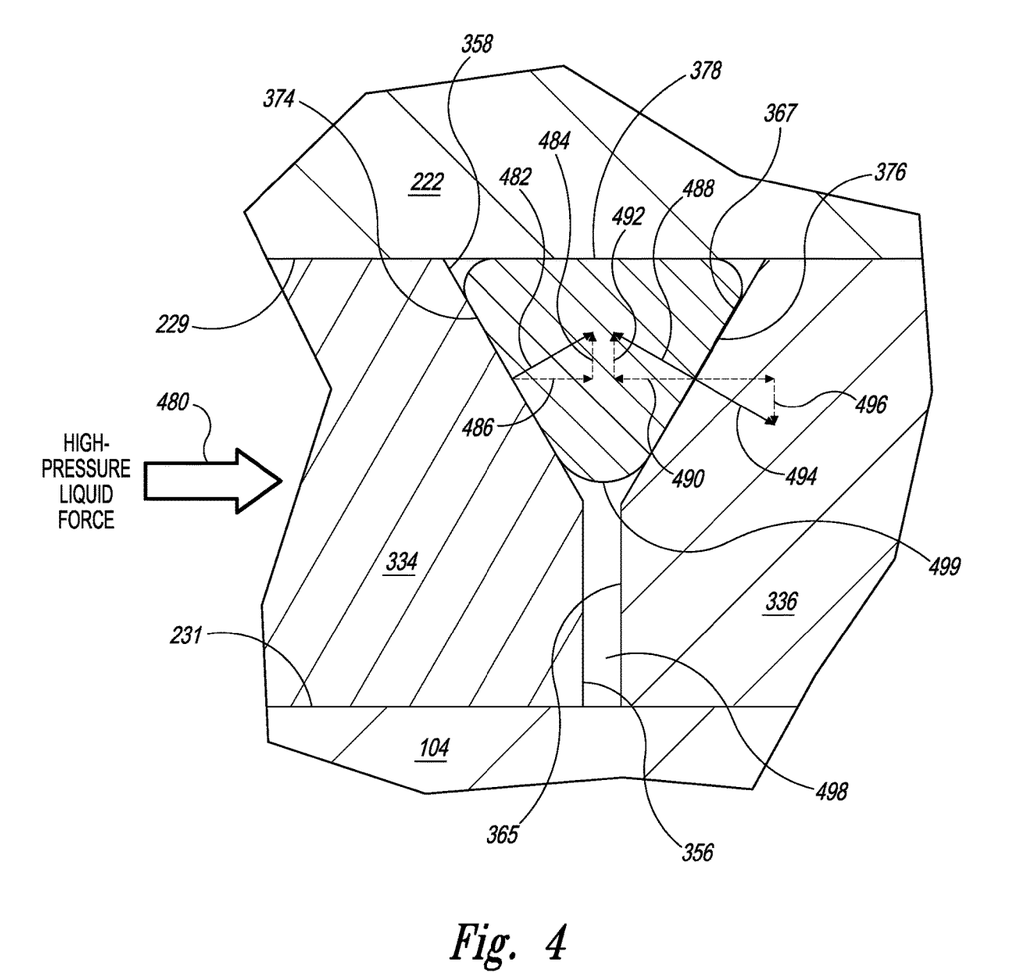
FIG. 4 is a further enlarged, side cross-sectional view of a hoop ring of the seal assembly of FIG. 3, configured in accordance with embodiments of the present technology.

FIG. 4 illustrates a close-up cross-sectional view of the hoop ring 338 and adjacent faces of the annular seal 334 and backup ring 336. In operation, high-pressure water or other fluid in the high-pressure liquid chamber 220 exerts an axial force 480 on the first end portion 344 of the annular seal 334. A portion of this axial force 480 is transformed into a first normal force 482 exerted on the first surface 374 of the hoop ring 338 by the second surface 358 of the second end portion 354 of the annular seal 334. A radial portion 484 of the first normal force 482 pushes the hoop ring 338 against the inner wall 229 of the cylinder 222 to an expanded configuration to support the annular seal 234 across this interface to inhibit or prevent the high-pressure fluid from leaking between the cylinder 222 and the seal assembly 230, and to inhibit or prevent the annular seal 334 from extruding between the hoop ring 338 and the inner wall 229 of the cylinder 222. An axial component 486 of the first normal force 482 pushes the hoop ring 338 toward the backup ring 336. In order to maintain the hoop ring 338 in static equilibrium (e.g., by Newton's second law), the backup ring 336 exerts a second normal force 488 on the hoop ring 338. More specifically, the second normal force is exerted by the second surface 367 of the first end portion 364 of the backup ring 336 onto the second surface 376 of the hoop ring 338. The axial component 490 of the second normal force 488 is equal to or substantially equal to and opposite the axial component 486 of the first normal force 482 exerted on the hoop ring 338 by the annular seal 334. The radial component 492 of the second normal force 488 provides additional outward force onto the hoop ring 338 to push the hoop ring 338 against the inner wall 229 of the cylinder 222. Further, by Newton's third law, the hoop ring 338 exerts a normal force 494 on the backup ring 336 equal to and opposite the force 488 the backup ring 336 exerts on the hoop ring 338. This third normal force 494 exerted by the second surface of the hoop ring 338 onto the second surface 367 of the first end portion 364 of the backup ring 336 has a radial component 496 that pushes the first end portion 364 of the backup ring 336 against the plunger 104 to a compressed configuration to support the annular seal 334 across this interface to inhibit or prevent high-pressure liquid from leaking between the plunger 104 and the seal assembly 230, and to inhibit or prevent the annular seal 334 from extruding between the backup ring 336 and the plunger 104. Preferably, the angles A1, A2 (FIG. 3) of the first and second surfaces 374, 376 of the hoop ring 338 (and of the opposing second surfaces 358, 367 of the annular seal 334 and backup ring 336) are identical or substantially identical to reduce the risk of force imbalances in the seal assembly 230.

When the force applied by the high-pressure fluid on the annular seal is removed, the annular seal 334, backup ring 336, and/or the hoop ring 338 can return (e.g., rebound) to the configuration illustrated in FIG. 4 (e.g., an unstressed configuration). Such resilience can be achieved by avoiding unwanted extrusion of the annular seal 334.

As explained above, in the absence of remedial measures, the annular seals used in many liquid jet cutting systems can extrude between the backup ring and the plunger, between the hoop ring and the cylinder, and/or between the hoop ring and the backup ring. Features of the present technology inhibit such extrusion, as explained below.

First, the radially outward forces applied to the hoop ring 338 of the present technology by both the backup ring 336 and the annular seal 334 reduce or eliminate extrusion of the annular seal 334 between the hoop ring 338 and the cylinder 222. Additionally, the radially inward force applied by the hoop ring 338 onto the backup ring 336 reduces or eliminates extrusion of the annular seal 334 between the backup ring 336 and the plunger 104.

With further reference to FIG. 4, an annular chamber 498 or gap is present between the annular seal 334 and the backup ring 336 when the high-pressure fluid is not exerting an axial force on the annular seal 334. This gap can allow the radially inward force applied on the backup ring 336 by the hoop ring 338 to push the backup ring 336 against the outer wall of the plunger 104 before the annular seal 334 extrudes into contact with the backup ring 336.

In some embodiments, a radially-inner apex 499 of the cross-section of the hoop ring 338 (e.g., a portion of the hoop ring 338 at which the first and second surfaces meet) is positioned near the transitions between the first and second surface of each of the annular seal 334 and the backup ring 336 (e.g., at a location near the radially-outermost edges of the first surfaces). Positioning the inner apex 499 of the hoop ring 338 near the transition between the first and second surfaces of the first end of the backup ring 336 can allow the second surface 376 of the hoop ring 338 to compress against the second surface 367 of the backup ring 336 before the annular seal 334 has the opportunity to extrude into the space between the hoop ring 338 and the backup ring 336 when high-pressure fluid exerts axial force on the first end of the annular seal 334.

The arrangement of the first surfaces 356, 365 of the opposing ends of the annular seal 334 and the backup ring 336 (i.e., the second end of the annular seal 334 and the first end of the backup ring 336) can also reduce the opportunity for extrusion of the annular seal 334. More specifically, using opposing faces 356, 365 radially-inward from the hoop ring 338 that are parallel to each other and perpendicular to the axial forces on the seal assembly 230 reduces the risk that one opposing face will slip past the other. Moreover, avoiding any overlap between the annular seal 334 and the backup ring 336 when the seal assembly 230 is in an unstressed configuration (e.g., when high-pressure fluid is not applying force to the annular seal 334) can reduce the risk that portions of the annular seal 334 and backup ring 336 slide past each other during operation.

Selecting the appropriate angles for the surfaces of the hoop ring 338 can have a direct impact on the performance of the seal assembly 230. For example, as explained above, the first and second surfaces 374, 376 of the hoop ring 338 are preferably at identical or substantially identical angles A1, A2 with respect to the longitudinal axis 345 of the plunger 104. If those angles A1, A2 are too large, the radially-inward force on the backup ring 336 may be too small to prevent the annular seal 334 from extruding between the backup ring 336 and the plunger 104. If the angles A1, A2 are too small, the backup ring 336 may compress too tightly against the plunger 104 and possibly damage the plunger 104. Accordingly, using angles between 50° and 80° are preferred.

The radial thickness R1 (FIG. 3) of the hoop ring 338 can also affect the likelihood of unwanted extrusion of the annular seal 334 and/or the flexibility of the hoop ring 338. If the radial thickness R1 of the hoop ring 338 is too great, the radial forces imparted on the backup ring 336 by the hoop ring 338 can damage the backup ring 336 and/or the plunger 104 via the backup ring 336. If the radial thickness R1 is too small, the radial force applied to the backup ring 336 by the hoop ring 338 can be insufficient to prevent extrusion of the annular seal 334 between the backup ring 336 and the plunger 104.

Some examples of the disclosed technology are further described below.

Example 1. A seal assembly for use with a liquid jet cutting system, comprising:

an annular seal having—
 a longitudinal axis;
 a first end portion;
 a second end portion opposite the first end portion along the longitudinal axis, the second end portion having—
  a first annular face facing away from the first end portion of the annular seal; and
  a first tapered portion extending from the first annular face away from the longitudinal axis and toward the first end portion of the annular seal; and
 a radially-inner surface configured to seal an outer surface of a plunger of the liquid jet cutting system;
an annular backup ring coaxial with the annular seal along the longitudinal axis of the annular seal, the annular backup ring having—
 a first end portion having—
  a second annular face facing the first annular face of the annular seal; and
  a second tapered portion extending from the second annular face away from the longitudinal axis and away from the annular seal; and
 a second end portion opposite the first end portion of the annular backup ring along the longitudinal axis; and
an annular hoop ring coaxial with the annular seal along the longitudinal axis of the annular seal and positioned between the annular seal and the annular backup ring, the annular hoop ring having a—
 a first tapered surface configured to engage the first tapered portion of the second end portion of the annular seal; and
 a second tapered surface configured to engage the second tapered portion of the first end portion of the annular backup ring;
wherein an angle between the second tapered surface and the longitudinal axis of the annular hoop ring, when measured in a plane on which the longitudinal axis of the annular seal lies, is between 50 degrees and 80 degrees.

Example 2. The seal assembly of example 1 wherein the liquid jet cutting system is a water jet cutting system.

Example 3. The seal assembly of example 1 wherein the hoop ring comprises an aluminum bronze alloy.

Example 4. The seal assembly of example 1 wherein the hoop ring has a substantially triangular cross-section on cut-plane on which the longitudinal axis of the annular seal lies.

Example 5. The seal assembly of example 1 wherein a radial thickness of the hoop ring, when measured perpendicular to the longitudinal axis of the annular seal, is between ⅓ and ⅔ of a radial distance between an outer surface of the plunger and an inner surface of a cylinder surrounding the hoop ring.

Example 6. The seal assembly of example 5 wherein the radial thickness of the hoop ring, when measured perpendicular to the longitudinal axis of the annular seal, is ½ of the radial distance between the outer surface of the plunger and the inner surface of the cylinder surrounding the hoop ring.

Example 7. The seal assembly of example 1 wherein the first annular face is configured to contact the second annular face when axial force is applied to the seal assembly.

Example 8. The seal assembly of example 1 wherein the second end portion of the annular seal is a mirror image of the first end portion of the annular backup ring across a plane perpendicular to the longitudinal axis of the annular seal.

Example 9. The seal assembly of example 1 wherein a radially-outermost edge of the first annular face and a radially-outermost edge of the second annular face are both located at an apex of the hoop ring when axial force is applied to the seal assembly.

Example 10. The seal assembly of example 1 wherein an angle between the first tapered portion and the second tapered portion, when measured in a plane on which the longitudinal axis of the annular seal lies, is between 58 degrees and 64 degrees.

Example 11. The seal assembly of example 1 wherein the annular backup ring does not overlap the annular seal in a direction parallel to the longitudinal axis of the annular seal.

Example 12. The seal assembly of example 1, further comprising a gasket positioned between the annular seal and a cylinder surrounding the annular seal, wherein the gasket is configured to inhibit or prevent fluid passage between the annular seal and the cylinder.

Example 13. The seal assembly of example 1 wherein the hoop ring has a substantially isosceles triangular cross-section on cut-plane on which the longitudinal axis of the annular seal lies.

Example 14. A method of sealing a plunger of a liquid jet cutting system during a plurality of pressure cycles using a seal assembly, the seal assembly having a longitudinal axis and being disposed about the plunger between the plunger and a cylinder of the liquid jet cutting system, and a backup ring of the seal assembly abutting a seal housing of the liquid jet cutting system, the method comprising:
  applying axial pressure, parallel to the longitudinal axis of the seal assembly, to an annular seal of the seal assembly such that a first normal annular force is applied on a first surface of a hoop ring of the seal assembly by an annular surface of the annular seal, the first surface of the hoop ring being at a first oblique angle with respect to the longitudinal axis;
  pushing the hoop ring radially outward to an expanded configuration against the cylinder via a radial component of the first normal annular force perpendicular to the longitudinal axis;
  transmitting an axial component of the first normal annular force, parallel to the longitudinal axis, to an annular surface of the backup ring of the seal assembly as a second normal annular force via a second surface of the hoop ring, the second surface of the hoop ring being at a second oblique angle with respect to the longitudinal axis;
  pushing the backup ring to a compressed configuration against the plunger via a radial component of the second normal annular force;
  balancing the axial component of the first normal annular force with an axial component of the second normal annular force to generate a static seal about the plunger; and
  decreasing axial pressure on the annular seal such that the hoop ring and the backup ring rebound from the expanded configuration and compressed configuration, respectively.

Example 15. The method of example 14 wherein balancing the axial component of the first normal annular force with the axial component of the second normal annular force comprises seating the backup ring against the endcap.

Example 16. The method of example 14 wherein applying axial pressure to the annular seal of the seal assembly comprises driving the annular seal toward the backup ring such that the annular seal abuts the backup ring along a portion of the backup ring radially-inward from the annular surface of the backup ring.

Example 17. The method of example 14 wherein both the first oblique angle and the second oblique angle are between 50 degrees and 65 degrees.

Example 18. The method of example 17 wherein the first oblique angle is equal to the second oblique angle.

Example 19. The method of example 14 wherein a radial thickness of the hoop ring, when measured perpendicular to the longitudinal axis, is between ⅓ and ⅔ of a radial distance between an outer surface of the plunger and an inner surface of the cylinder.

Example 20. The method of example 19 wherein the radial thickness of the hoop ring, when measured perpendicular to the longitudinal axis, is ½ of the radial distance between the outer surface of the plunger and the inner surface of the cylinder.

Example 21. A method of installing a seal assembly in a liquid jet cutting system, the method comprising:
  disposing a backup ring about a proximal end of a plunger of the liquid jet cutting system;
  disposing a hoop ring about the proximal end of the plunger such that a first angled surface of the hoop ring contacts a frustoconical surface of the backup ring; and
  disposing a seal about the proximal end of the plunger such that a frustoconical surface of the seal contacts a second angled surface of the hoop ring and the hoop ring is positioned between the frustoconical surfaces of the seal and the backup ring;
  wherein the backup ring does not contact the seal prior to operation of the liquid jet cutting system.

Example 22. The method of example 21, further comprising disposing an O-ring about a radially-outward surface of the seal.

Example 23. The method of example 21 wherein the backup ring does not overlap the seal along a longitudinal axis of the plunger.

Example 24. The method of example 21 further comprising abutting the backup ring against an endcap of the liquid jet cutting system.

Example 25. The method of example 21 wherein the frustoconical surface of the backup ring is a mirror image of the frustoconical surface of the seal with respect to the hoop ring References throughout the foregoing description to features, advantages, or similar language do not imply that all of the features and advantages that may be realized with the present technology should be or are in any single embodiment of the technology. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

As one of ordinary skill in the art will appreciate, embodiments of the seal assemblies described herein can provide extended seal assembly life by reducing or eliminating extrusion of the annular seal around the hoop ring and/or around the backup ring.

The above Detailed Description of examples and embodiments of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes are presented in a given order, alternative implementations may perform routines having steps in a different order, and some processes may be deleted, moved, added, subdivided, combined, and/or modified to provide alternative or sub-combinations. The teachings of the present disclosure provided herein can be applied to other systems, not necessarily the system described above. The elements and acts of the various embodiments described above can be combined to provide further embodiments. All of the patents and applications and other references identified herein, including any that may be listed in accompanying filing papers, are incorporated herein by reference. Aspects of the present disclosure can be modified, if necessary, to employ the systems, functions, and concepts of the various references described above to provide yet further embodiments of the present disclosure.

In general, the terms used in the following claims should not be construed to limit the present disclosure to the specific embodiments disclosed in the specification, unless the above Detailed Description section explicitly defines such terms. Accordingly, the actual scope of the present disclosure encompasses not only the disclosed embodiments, but also all equivalent ways of practicing or implementing the present disclosure.

From the foregoing, it will be appreciated that specific embodiments of the technology have been described herein for purposes of illustration, but that various modifications may be made without deviating from the spirit and scope of the various embodiments of the technology. Further, while various advantages associated with certain embodiments of the technology have been described above in the context of those embodiments, other embodiments may also exhibit such advantages, and not all embodiments need necessarily exhibit such advantages to fall within the scope of the technology. Accordingly, the technology is not limited, except as by the appended claims. Moreover, although certain aspects of the technology are presented below in certain claim forms, the applicant contemplates the various aspects of the technology in any number of claim forms. Accordingly, the applicant reserves the right to pursue additional claims after filing this application to pursue such additional claim forms, in either this application or in a continuing application.

I claim:

1. A seal assembly for use with a liquid jet cutting system, comprising:
   an annular seal having—
     a longitudinal axis;
     a first end portion;
     a second end portion opposite the first end portion along the longitudinal axis, the second end portion having—
       a first annular face facing away from the first end portion of the annular seal;
       a first tapered portion extending from the first annular face away from the longitudinal axis and toward the first end portion of the annular seal; and
       a first transition between the first annular face and the first tapered portion; and
     a radially-inner surface configured to seal an outer surface of a plunger of the liquid jet cutting system;
   an annular backup ring coaxial with the annular seal along the longitudinal axis of the annular seal, the annular backup ring having—
     a first end portion having—
       a second annular face facing the first annular face of the annular seal;
       a second tapered portion extending from the second annular face away from the longitudinal axis and away from the annular seal; and
       a second transition between the second annular face and the second tapered portion; and
     a second end portion opposite the first end portion of the annular backup ring along the longitudinal axis,
     wherein the annular backup ring does not overlap the annular seal in a direction parallel to the longitudinal axis of the annular seal; and
   an annular hoop ring coaxial with the annular seal along the longitudinal axis of the annular seal and positioned between the annular seal and the annular backup ring, the annular hoop ring having a—
     a first tapered surface configured to engage the first tapered portion of the second end portion of the annular seal;
     a second tapered surface configured to engage the second tapered portion of the first end portion of the annular backup ring; and
     a radially-inner apex between the first tapered surface and the second tapered surface and configured to be positioned adjacent the first transition and the second transition;
   wherein an angle between the second tapered surface and the longitudinal axis of the annular hoop ring, when measured in a plane on which the longitudinal axis of the annular seal lies, is between 50 degrees and 80 degrees.

2. The seal assembly of claim 1 wherein the seal assembly is configured for use with a water jet cutting system.

3. The seal assembly of claim 1 wherein the annular hoop ring comprises an aluminum bronze alloy.

4. The seal assembly of claim 1 wherein the annular hoop ring has a substantially triangular cross-section on a cut-plane on which the longitudinal axis of the annular seal lies.

5. The seal assembly of claim 1 wherein a radial thickness of the annular hoop ring, when measured perpendicular to the longitudinal axis of the annular seal, is between ⅓ and ⅔ of a radial distance between an outer surface of the plunger and an inner surface of a cylinder surrounding the annular hoop ring.

6. The seal assembly of claim 5 wherein the radial thickness of the annular hoop ring, when measured perpendicular to the longitudinal axis of the annular seal, is ½ of the radial distance between the outer surface of the plunger and the inner surface of the cylinder surrounding the annular hoop ring.

7. The seal assembly of claim 1 wherein the first annular face is configured to contact the second annular face when axial force is applied to the seal assembly.

8. The seal assembly of claim 1 wherein the second end portion of the annular seal is a mirror image of the first end portion of the annular backup ring across a plane perpendicular to the longitudinal axis of the annular seal.

9. The seal assembly of claim 1 wherein a radially-outermost edge of the first annular face and a radially-outermost edge of the second annular face are both located at the radially-inner apex when axial force is applied to the seal assembly.

10. The seal assembly of claim 1 wherein an angle between the first tapered portion and the second tapered portion, when measured in a plane on which the longitudinal axis of the annular seal lies, is between 58 degrees and 64 degrees.

11. The seal assembly of claim 1, further comprising a gasket positioned between the annular seal and a cylinder surrounding the annular seal, wherein the gasket is configured to inhibit or prevent fluid passage between the annular seal and the cylinder.

12. The seal assembly of claim 1 wherein the annular hoop ring has a substantially isosceles triangular cross-section on cut-plane on which the longitudinal axis of the annular seal lies.

13. The seal assembly of claim 1 wherein the annular hoop ring is configured to contact the annular seal and the annular backup ring only along the first tapered surface and the second tapered surface, respectively.

14. The seal assembly of claim 1 wherein—
the annular seal further includes an outer surface configured to face a cylinder of the liquid jet cutting system and defines a radial clearance between the radially-inner surface of the annular seal and the outer surface;
the annular hoop ring has a radial thickness; and
the radial thickness of the annular hoop ring is between 33% to 66% of the radial clearance defined by the annular seal.

15. The seal assembly of claim 14 wherein the radial thickness of the annular hoop ring is between 40% to 60% of the radial clearance defined by the annular seal.

16. The seal assembly of claim 14 wherein the radial thickness of the annular hoop ring is between 45% to 55% of the radial clearance defined by the annular seal.

\* \* \* \* \*